United States Patent [19]

Binz et al.

[11] Patent Number: 5,065,454
[45] Date of Patent: Nov. 12, 1991

[54] CLOCK DISTRIBUTOR

[75] Inventors: Reiner Binz, Ebenhausen; Hartmut Burghardt, Holzkirchen, both of Fed. Rep. of Germany

[73] Assignee: Siemens Aktiengesellschaft, Munich, Fed. Rep. of Germany

[21] Appl. No.: 516,773

[22] Filed: Apr. 30, 1990

[30] Foreign Application Priority Data

Apr. 28, 1989 [DE] Fed. Rep. of Germany ....... 3914177

[51] Int. Cl.⁵ ............................................ H04B 10/00
[52] U.S. Cl. .................................... 359/184; 307/219;
328/60; 359/158; 359/173; 385/45
[58] Field of Search ........................ 455/608, 612, 610;
375/38; 328/60, 71; 307/219; 350/96.1, 96.15

[56] References Cited

U.S. PATENT DOCUMENTS

| | | | |
|---|---|---|---|
| 3,751,685 | 8/1973 | Kaeger | 307/219 |
| 4,644,498 | 2/1987 | Bedard et al. | 307/219 |
| 4,779,008 | 10/1988 | Kessels | 307/219 |
| 4,829,198 | 5/1989 | Maley et al. | 307/219 |
| 4,839,855 | 6/1989 | Van Driel | 307/219 |
| 4,893,306 | 1/1990 | Chao et al. | 370/94.2 |

OTHER PUBLICATIONS

OPTO Elektronik Magazin, vol. 2, 1986, No. 3, Fachberichte, pp. 202-213.
Telcom Report 4 (1981) Beiheft Digitalvermittlungssystem EWSD pp. 43-48, Technik.

Primary Examiner—Reinhard J. Eisenzopf
Assistant Examiner—Kinfe-Michael Negash
Attorney, Agent, or Firm—Hill, Van Saten, Steadman & Simpson

[57] ABSTRACT

In a digital switching center for a telephone switching system or the like, a clock signal distribution arrangement having a redundant central clock generator supplying clock signals to the switching matrices the arrangement including electro-optical transducers, brancher modules, light conductors and opto-electrical transducers connected in signal distribution paths between the clock generator and the switching matrices. The distribution paths are doubled for redundancy purposes.

5 Claims, 3 Drawing Sheets

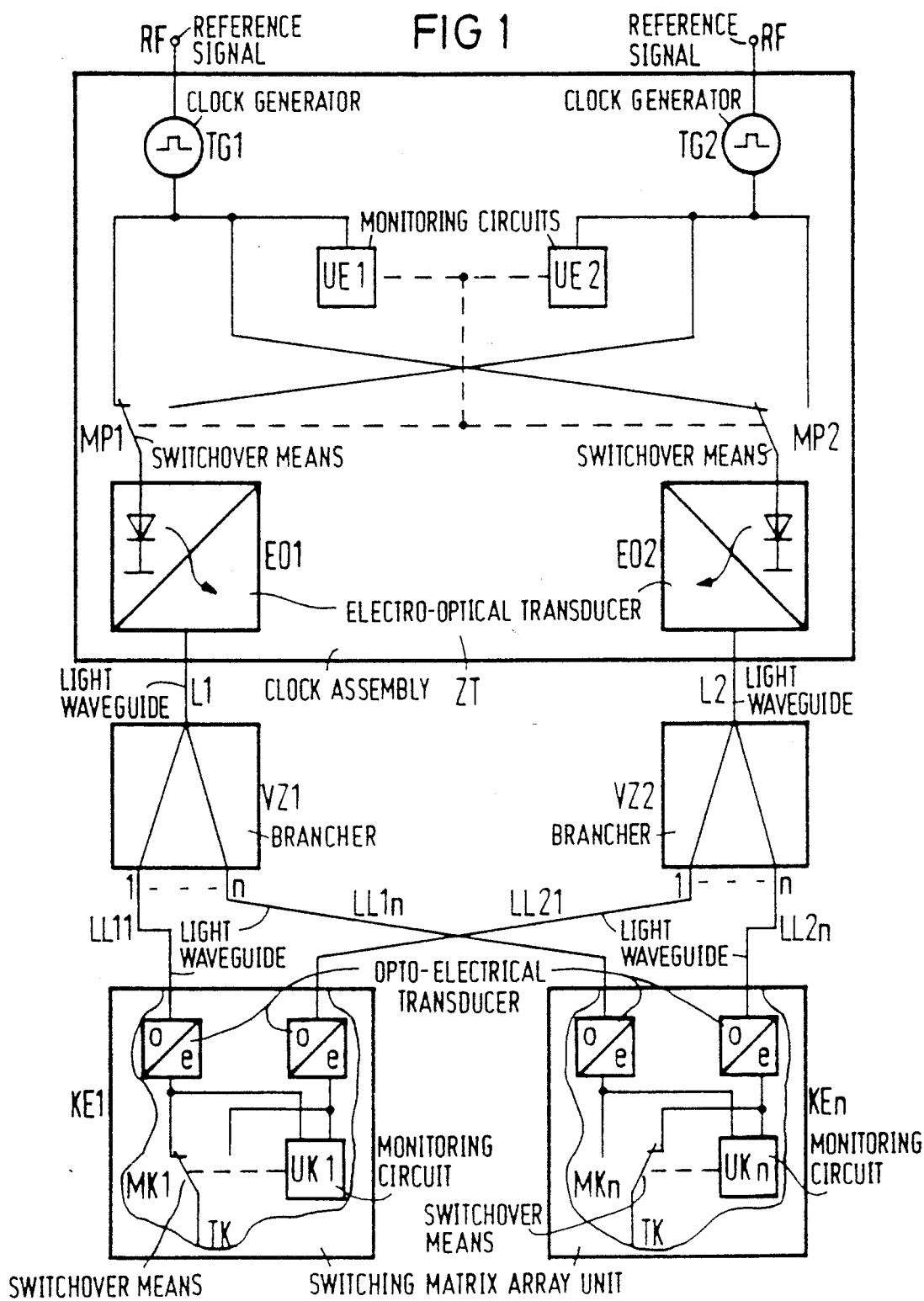

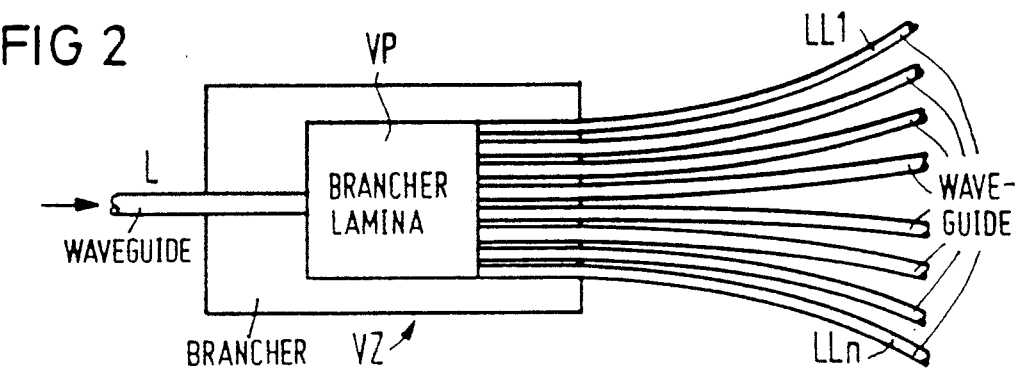
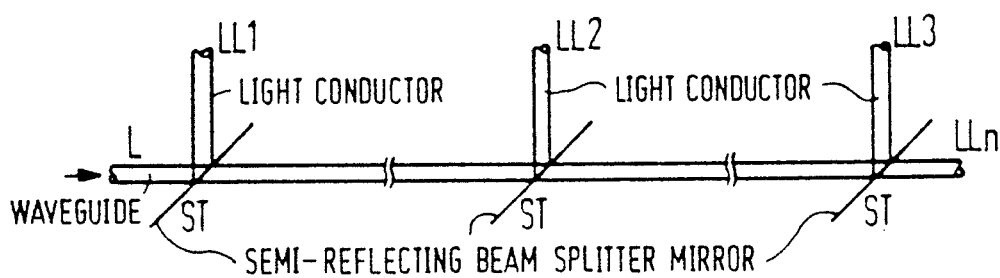
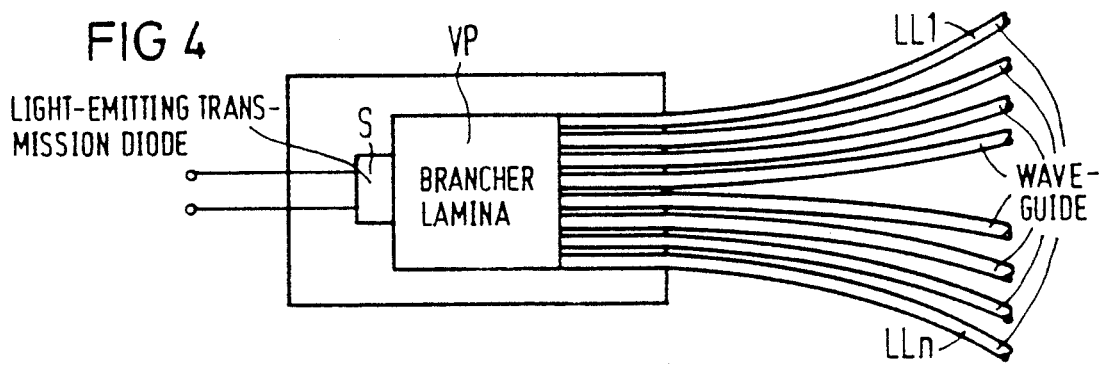

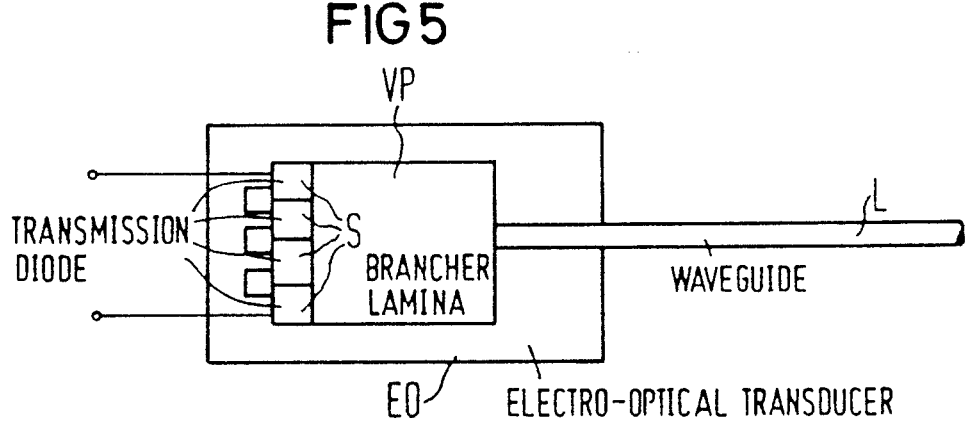
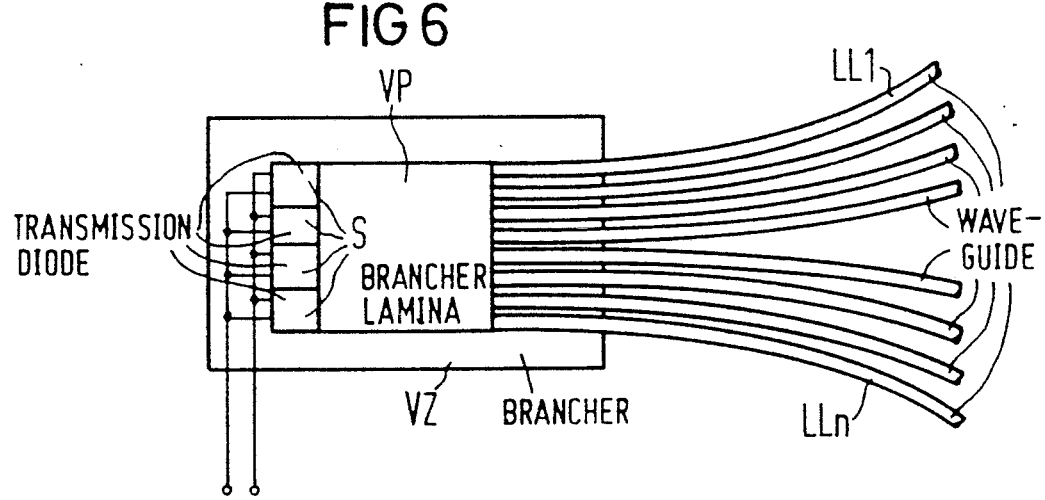

CLOCK DISTRIBUTOR

BACKGROUND OF THE INVENTION

1. Field of the Invention

The present invention relates generally to a clock signal generator for telephone switching systems and the like for generating a redundant clock signal.

2. Description of the Related Art

Based on agreements of the national postal administrations in, for example, West Europe the national digital networks are operated in unsolicited fashion. To avoid losses of information, this unsolicited plesio chronic operating mode requires an extremely precise observation of the prescribed clock frequency as well as a high dependability against outage or interruption of the clock signal. To this end, central clock generators are provided in digital switching centers of the digital network and are guided from a central reference frequency source. To further increase the reliability against the occurrence of an outage of the clock signal, redundant clock generators are provided in the digital switching centers. The redundant clock generators are used to check each other mutually and, when a fault occurs in the active clock generator, the system automatically switches to the other standby clock generator.

In known clock distributor means in digital switching centers, as described in a Telcom Report, 4, (1981) supplement "Digitalvermittlungssystem EWSD", pages 43-48, the distribution of the clock signal to switching matrix array units to be supplied with the clock signals ensues via copper lines, so that a line driver must be provided for every line. Given employment of a copper lines formed of wire pairs that are balanced to ground, moreover, two line drivers per copper line must be provided. In addition to the outlay for components used in the line drivers, power losses which occur, for example, due to the recharging of the copper lines at a clock frequency of 140 MHz that is typical for digital switching centers or as appear in the terminating impedances of the copper lines have a disadvantageous effect. Over and above this, special measures are necessary for these clock frequencies to avoid the emission of or picking up of disturbances from neighboring lines.

SUMMARY OF THE INVENTION

The present invention is related to a clock distributor that avoids the afore-mentioned disadvantages.

This and other objects and advantages of the invention are achieved in a clock distributor means for telephone switching centers having a redundant electrical clock generator, whereby the clock signal output that is activated is connected to clock-controlled switching matrix array units, whereby each such connection proceeds via an electro-optical transducer following the electrical clock generator and is shared by a plurality of connections and proceeds via an optical brancher following thereupon whose outputs lead to the inputs of the clock-control switching matrix array units.

The invention yields an advantage in that the outlay or expense for components caused by the line drivers as well as the dissipated power converted in such line drivers is eliminated. As a result of the principle upon which the invention is based, problems which arise in conjunction with electromagnetic compatibility are avoided at the very outset using the clock distributor means of the present invention. As a further advantage, a galvanic connection of the switching matrix array units to be supplied with the clock signal is avoided via the clock distributor means in the subject matter of the application, so that undesired ground loops caused as a result thereof that, moreover, can be contrary to the local administration rules regarding grounding, do not arise from the very outset.

According to a further development of the invention, two separate connections are provided between the through-connected clock generator (TG1 and TG2) and the clock-controlled switching matrix array units. The clock signal thus pends, or waits, at all switching matrices through two independent transmission paths; the clock distributor means thus additionally comprises a corresponding path redundancy.

In a further development of the invention, the optical brancher is constructed in multi-stage fashion, which may potentially make it easier to do justice to the respective spatial modification of the switching matrix array parts. Additional supply lines can thereby be foregone since the branchers are a matter of purely passive components. The assembly that carries the clock generator has the same dimensions for every size of digital switching center and thus an additional branching stage merely has to be provided for every additional assembly to be supplied with the clock signal.

According to yet another development of the invention, the electro-optical transducer and the optical brancher form one structural unit, whereby the light waveguide between the electro-optical transducer and the optical brancher are eliminated. This development allows a further reduction in the outlay for components since the optical brancher is integrated in the electro-optical transducer. This development proves especially advantageous in a star-shaped arrangement of the switching matrix array units to be supplied with the clock signal, namely a star-shaped arrangement thereof around the clock generator.

A further development of the invention provides a plurality of transmitters connected electrically in parallel which are provided in the electro-optical transducer.

BRIEF DESCRIPTION OF THE DRAWINGS

FIG. 1 is a schematic diagram of a clock distributor according to the principles of the present invention;

FIG. 2 is a schematic diagram of a brancher

FIG. 3 is a schematic diagram of a multi-stage brancher; and

FIG. 4 is a schematic diagram of a combination electro-optical transducer and optical brancher.

FIG. 5 is a schematic diagram of a further embodiment of a combined electro-optical transducer and optical brancher; and FIG. 6 is a schematic diagram of yet another combined electro-optical transducer and optical brancher.

DESCRIPTION OF THE PREFERRED EMBODIMENTS

FIG. 1 schematically shows a clock distributor means in sufficient detail for an understanding of the present invention. A clock signal is transmitted from a clock assembly ZT to switching matrix array units KE1 through KEn along an optical path. Monitoring circuits UE1 and UE2 which are individually associated with the clock generators are connected to the outputs of two clock generators TG1 and TG2. A reference signal is supplied to each of the clock generators TG1 and TG2 via inputs RF. The monitoring circuits UE1 and UE2 in turn control switchover means MP1 and MP2. The switchover means MP1 and MP2 either connect the output of the clock generator TG1 or the output of the clock generator TG2 to the inputs of two electro-optical transducers EO1 and EO2. The clock generator TG1 or TG2 which has its output connected to the transducers EO1 and EO2 is referred to as the active clock generator, while the other clock generator is a hot-standby clock generator, since it is not then active but is running simultaneously.

The electro-optical transducers EO1 and EO2 are each connected to a respective brancher VZ1 and VZ2 through a light waveguide L1 and L2; light waveguides LL11 through LL1n and LL21 through LL2n connect each brancher VZ1 and VZ2 to every switching matrix array unit KE1 through KEn. The switching matrix array units KE1 through KEn each respectively include two opto-electrical transducers o/e whose outputs are connected to the switchover contacts of a respective switchover means MK1 through MKn and to the inputs of a monitoring circuit UK1 through UKn, that in turn controls the respective switchover means MK1 through MKn.

As known, for example, from the published Telcom Report, cited above, the clock generators TG1 and TG2 can be formed with two clock generators that are synchronized through a reference signal applied at their inputs RF. For example, this reference signal may be established by an 8 kHz signal derived by a frequency controlled network superimposed on the digital switching centers. The switchover means MP1 and MP2, which can be expediently realized by electronic switches, assure that only the output signal of one of the clock generators TG1 or TG2 is supplied to the respective electro-optical transducers EO1 and EO2. The monitoring circuits UE1 and UE2 that control the switchover means MP1 and MP2 monitor, first, the output signal of the clock generator that is connected via the switchover means MP1 and MP2 to the electro-optical transducers EO1 and EO2 with respect to the pulse duty factor and period duration of the clock signal. Secondly, the monitoring circuits UE1 and UE2 monitor the synchronism of the clock generators TG1 and TG2, whereby they switch to the clock generator TG1 or TG2 previously running in the hot-standby mode when a prescribed error limit is exceeded. By way of addition, it is noted that a switching from one clock generator TG1 or TG2 to the other clock generator TG2 or TG1 can also ensue proceeding from a central control unit that is not shown in detail here.

The electro-optical transducers EO1 and EO2 are made with commercially available component parts, wherein the light signal generated in the transmission diode by an electrical input signal is supplied to a light conductor.

With reference to FIG. 2, the branchers VZ1 and VZ2 are formed in a known way; as known, for example, from the supplementary reprint from "OPTO ELEKTRONIK MAGAZIN" (1986), No. 3, pages 202 through 213 of Siemens AG. The branchers VZ are formed by mixers at whose input a single light conductor L supplies a signal to be branched to a brancher lamina VP by which the light is branched out onto a plurality of light conductors LL1 through LLn of the output side.

In another embodiment of the invention, the branchers VZ1 and VZ2 are formed as multi-stage branchers. To that end, it is possible to connect the output of the brancher VZ as shown in FIG. 2 to the input of a corresponding, following brancher. It is just as easily possible, however, to realize a multi-stage brancher by a series connection of a plurality of optical branchers that work on the beam splitter principle.

As shown in FIG. 3 or as disclosed in, for example, the supplemental reprint from "OPTO ELEKTRONIK MAGAZIN" (1986), No. 3, pages 202 through 213, such branchers can each be formed with a semi-reflecting beam splitter mirror ST at which the optical signal brought in by the light conductor, or waveguide, L is partly deflected into a light conductor LL1, LL2, LL3, etc. that, in a clock distributor means of the invention, then leads to a switching matrix array unit to be supplied with the clock signal. The non-deflected portion of the optical signal passes through the beam splitter mirror ST, retaining the original propagation direction, and continuing in the light waveguide L.

In another development of the invention, the electro-optical transducer EO and the optical brancher VZ form a structural unit. To that end, the mixer known from, for example, the supplement reprint from "OPTO ELEKTRONIK MAGAZIN" (1986), No. 3, pages 202 through 213 can be modified to the effect. As shown in FIG. 4, a light-emitting transmission diode S transmits, without interposition of an optical fiber, directly into a brancher lamina VP by which the optical transmission signal is distributed onto the light conductors LL1 through LLn on the output side.

For a clock distributor means of the invention, a clock distribution of the number of switching matrix array units KE1 through KEn to be supplied with the clock signal is possible, even when little optical power arrives at the individual switching matrix array units KE1 through KEn to be supplied with the clock signal, due to the division ratio that is then correspondingly small in accord with the number of switching matrix array units and due to passband attenuations along the optical distributor path. This optical power, however, is adequate to feed the input side of a narrow-band amplifier and, thus, a low-noise amplifier correspondingly allowing a high gain. It has been surprisingly shown, namely, that the distribution of the clock signal that has a narrow-band frequency spectrum is possible to a far greater number of switching matrix array units to be supplied with the clock signal than is known on the basis of optical data transmission systems or that could have been anticipated on the basis of mathematical calculations.

To boost the optical power that is supplied to the switching matrix array units KE1 through KEn, it is possible to provide a plurality of transmission diodes S in the electro-optical transducers EO1 and EO2 of FIG. 1, as shown for a transducer EO in FIG. 5 or in the combined electro-optical transducer and brancher of FIG. 4 as shown in FIG. 6. These transmission diodes S emitting the optical signal they output in parallel and supplying an increased optical power into the optical clock distributor system.

As may be seen in FIG. 1, every switching matrix network unit KE1 through KEn is supplied with a clock output signal of the clock generator TG1 or TG2 whose output is then connected through the switchover means MP1 and MP2 to the electro-optical transducers EO1 and EO2, via two mutually independent optical distribution paths. Thereat, the optical signals are converted into an electrical signal in the opto-electrical transducers o/e that are adequately known and that essentially contain a photodiode or a phototransistor having a following pre-amplifier. The presence of this electrical signal is monitored with the assistance of a monitoring circuit UK1 through UKn included each with the respective switching matrix array unit KE1 through KEn.

Given outage of the clock signal that is supplied to the respective switching matrix array unit KE1 and KEn at the moment, the respective monitoring circuit UK1 through UKn switches the appertaining switch-over means MK1 through MKn to the clock supply line that forms the respectively other optical connecting path to the respective switching matrix array unit KE1 through KEn. By way of addition it also be noted here that the monitoring circuits UK1 through UKn output status signals to a central unit that are not shown in detail here, these status signals corresponding to the monitoring status. As needed, this central unit can bring the switchover means MK1 and MKn into a defined position through the monitoring circuits UK1 through UKn.

Thus, a digital switching center includes a clock distribution from a central clock generator to switching matrices through electro-optical transducer, brancher modules, light conductors and opto-electrical transducers whereby the distribution paths are doubled for redundancy reasons.

Although other modifications and changes may be suggested by those skilled in the art, it is the intention of the inventors to embody within the patent warranted hereon all changes and modifications as reasonably and properly come within the scope of their contribution to the art.

We claim:

1. A clock distributor for a telephone system, comprising:
    redundant clock signal generators for generating clock signals at clock signal outputs, at any one time one of said redundant clock signal generators being designated as an active clock signal generator,;
    an electro-optical transducer having an input and having an output;
    a switching means for connecting said clock signal output of said active clock signal generator to said input of said electro-optical transducer;
    an optical brancher having an input connected at the output of the electro-optical transducer and having a plurality of outputs;
    a plurality of clock-controlled switching matrix array units having inputs; and
    a plurality of light wave guides each of which connecting said input of one of said switching matrix array units with one of said outputs of said optical brancher.

2. A clock distributor as claimed in claim 1, wherein said switching means, said electro-optical transducer, said optical brancher and one of said wave guides form a first signal path from said active clock signal generator to said switching matrix array units, and further comprising:
    a second switching means, a second electro-optical transducer, a second optical brancher and a second plurality of light wave guides all of which form a second signal path from said active clock signal generator to said switching matrix array units that is separated from said first signal path.

3. A clock distributor as claimed in claim 1, wherein said optical brancher is a multi-stage brancher.

4. A clock distributor as claimed in claim 1, wherein said electro-optical transducer and said optical brancher are combined so that said output of said electro-optical transducer is in close contact with said input of said optical brancher.

5. A clock distributor as claimed in claim 1, further comprising:
    a plurality of optical transmitters connected electrically in parallel in an electro-optical transducer.

* * * * *